United States Patent
Schlotter et al.

(10) Patent No.: US 9,783,179 B2
(45) Date of Patent: Oct. 10, 2017

(54) HYDRAULIC BLOCK FOR A HYDRAULIC MULTI-CIRCUIT VEHICLE BRAKING SYSTEM

(75) Inventors: Volkmar Schlotter, Obersulm (DE); Michael Kunz, Steinheim An der Murr (DE); Oliver Schmautz, Oberstenfeld (DE)

(73) Assignee: Robert Bosch GmbH, Stuttgart (DE)

(*) Notice: Subject to any disclaimer, the term of this patent is extended or adjusted under 35 U.S.C. 154(b) by 1037 days.

(21) Appl. No.: 13/823,779

(22) PCT Filed: Jul. 19, 2011

(86) PCT No.: PCT/EP2011/062344
§ 371 (c)(1),
(2), (4) Date: Jul. 1, 2013

(87) PCT Pub. No.: WO2012/034741
PCT Pub. Date: Mar. 22, 2012

(65) Prior Publication Data
US 2013/0276442 A1 Oct. 24, 2013

(30) Foreign Application Priority Data

Sep. 16, 2010 (DE) .................. 10 2010 040 868

(51) Int. Cl.
*B60T 8/36* (2006.01)
*B60T 17/04* (2006.01)
(Continued)

(52) U.S. Cl.
CPC ............ *B60T 17/04* (2013.01); *B60T 8/4872* (2013.01); *B60T 13/14* (2013.01); *B60T 17/06* (2013.01); *B60T 8/368* (2013.01)

(58) Field of Classification Search
CPC .......... B60T 8/26; B60T 8/4872; B60T 13/16; B60T 17/06; B60T 8/368
(Continued)

(56) References Cited

U.S. PATENT DOCUMENTS 6,672,688 B2 * 1/2004 Gale et al. ..................... 303/126
7,185,956 B2 * 3/2007 Reuter et al. ........... B60T 8/267
303/116.1
(Continued)

FOREIGN PATENT DOCUMENTS

DE 10 2006 020 890 A1 11/2007
DE 10 2008 005 147 A1 7/2008
(Continued)

OTHER PUBLICATIONS

International Search Report corresponding to PCT Application No. PCT/EP2011/062344, mailed Nov. 30, 2011 (German and English language document) (5 pages).

*Primary Examiner* — F. Daniel Lopez
(74) *Attorney, Agent, or Firm* — Maginot, Moore & Beck LLP

(57) ABSTRACT

A hydraulic block of a hydraulic multi-circuit vehicle braking system having braking force regulation includes an installation space for a hydraulic reservoir of the vehicle braking system that is isolated from a braking circuit, for example by closing a connecting line using a pressed-in ball. The installation space is connected to another braking circuit via an additional bore, wherein a larger storage volume is available to the braking circuit as a result. The necessary changes to the hydraulic block are small.

4 Claims, 1 Drawing Sheet

(51) Int. Cl.
*B60T 8/48* (2006.01)
*B60T 13/14* (2006.01)
*B60T 17/06* (2006.01)

(58) Field of Classification Search
USPC .................................. 60/585; 137/251, 417
See application file for complete search history.

(56) References Cited

U.S. PATENT DOCUMENTS

2003/0234574 A1* 12/2003 Reuter et al. ............... 303/116.2
2009/0072616 A1* 3/2009 Weh et al. ............ B60T 8/4872
303/113.2

FOREIGN PATENT DOCUMENTS

| | | |
|---|---|---|
| DE | 10 2007 031 308 A1 | 1/2009 |
| DE | 10 2008 004 201 A1 | 7/2009 |
| DE | 10 2009 000 580 A1 | 8/2010 |
| JP | 2000-517270 A | 12/2000 |
| JP | 2003-226233 A | 8/2003 |
| JP | 2006-282027 A | 10/2006 |
| JP | 2009-536126 A | 10/2009 |
| JP | 2011-509212 A | 3/2011 |

* cited by examiner

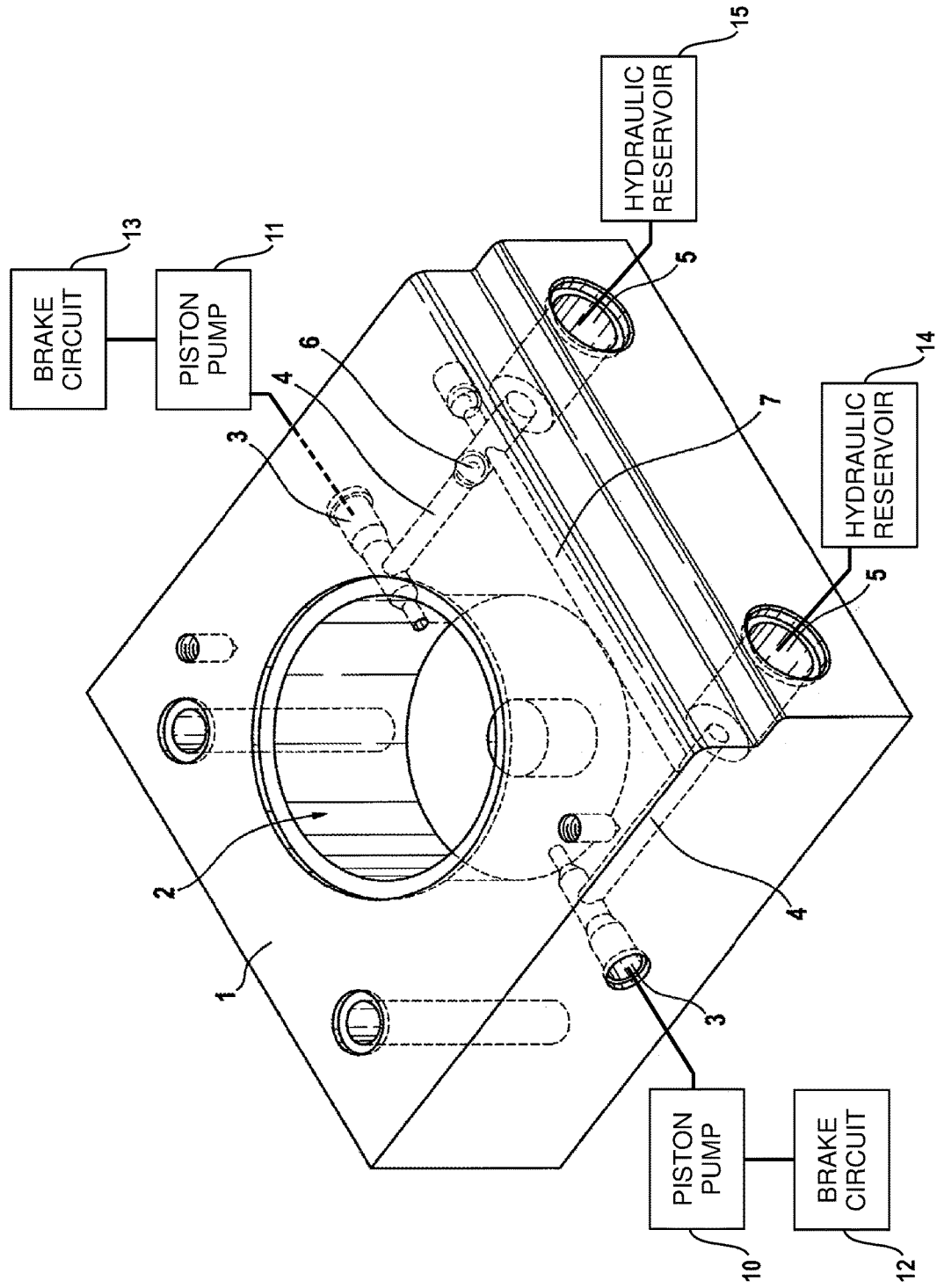

HYDRAULIC BLOCK FOR A HYDRAULIC MULTI-CIRCUIT VEHICLE BRAKING SYSTEM

This application is a 35 U.S.C. §371 National Stage Application of PCT/EP2011/062344, filed on Jul. 19, 2011, which claims the benefit of priority to Serial No. DE 10 2010 040 868.9, filed on Sep. 16, 2010 in Germany, the disclosures of which are incorporated herein by reference in their entirety.

The disclosure relates to a hydraulic block for a hydraulic multi-circuit vehicle brake system having the features described herein.

BACKGROUND

Such hydraulic blocks are customary in modern hydraulic vehicle brake systems with braking force control. The braking force can take place there on a wheel-specific basis, on an axis-specific basis, for groups of vehicle wheels or jointly for all the vehicle wheels which can be braked. Examples of braking force control systems are an anti-lock brake control system (ABS), a traction control system (TCS) and/or an anti-skid or vehicle movement dynamics control system (ESP). Electro-hydraulic vehicle brake systems also have braking force control. Electro-hydraulic vehicle brake systems are extraneous force braking systems in which a hydraulic brake pressure is not built up by means of muscle force but rather as extraneous energy with a hydraulic pump. A braking force control operation for the purpose of what is referred to as "blending" can also take place in hybrid vehicles or electric vehicles. Electric vehicles have an internal combustion engine and at least one electric motor as drive motors, wherein the drive can optionally take place with the internal combustion engine, the electric motor or motors or jointly with the internal combustion engine and the electric motor or motors. In order to recover energy during the braking of the vehicle, the electric motor is operated as a generator and generates current which is stored in an accumulator and is made available for driving the vehicle with the electric motor. To be more precise, kinetic energy of the moving vehicle is converted into electrical energy which is referred to as "recuperation". So that a vehicle driver notices as far as possible nothing, a braking force control operation reduces a braking force of the vehicle brake system in accordance with a braking torque of the electric motor in the generator mode. This is referred to as "blending". It is possible to combine various braking force control operations.

Apart from an electronic component, such braking force controllers have a hydraulic part with usually one hydraulic pump for each brake circuit, solenoid valves, hydraulic reservoirs, nonreturn valves, pressure-limiting valves. The enumeration is neither conclusive nor complete. For example, in the case of a wheel-specific braking force control system, a braking force buildup valve and a braking force reduction valve are assigned to each wheel brake. Furthermore, a master brake cylinder is usually connected to the vehicle brake system by one isolating valve per brake circuit, in order to be able to disconnect said cylinder hydraulically from the vehicle brake system in order to lower a brake pressure. In order to be able to lower the wheel brake pressures quickly, a hydraulic reservoir is usually provided in each brake circuit and a wheel brake is connected hydraulically to said hydraulic reservoir in the case of a wheel-specific braking force control system by, in each case, one of the brake pressure reduction valves.

The hydraulic components of such vehicle brake systems are accommodated in a hydraulic block and connected to one another hydraulically by means of said block. The hydraulic block usually has an installation space for each hydraulic component, usually in the form of a (stepped) drilled hole into which the component is inserted. The hydraulic connection is usually carried out by means of drilled holes in the hydraulic block. The hydraulic block as such is usually a solid block-shaped component which is provided with the drilled holes. It permits a compact and stable design of the hydraulic part of the braking force control system of a hydraulic vehicle brake system, wherein by means of the installation of the hydraulic components, these are additionally also hydraulically connected to one another, which removes the need for a separate hydraulic connection of the individual hydraulic components.

SUMMARY

The disclosure is provided for a hydraulic multi-circuit vehicle brake system having a braking force control which does not require a hydraulic reservoir in at least one brake circuit. An example of such a vehicle brake system is disclosed by German Laid-Open Patent Application DE 10 2008 004 201 A1, which is incorporated herein by reference in its entirety. The disclosure is based on a hydraulic block for a hydraulic multi-circuit vehicle brake system, which hydraulic block has at least two installation spaces for hydraulic reservoirs which are assigned to different brake circuits. In the hydraulic block according to the disclosure having the features of described herein, the at least two installation spaces for hydraulic reservoirs are assigned to one brake circuit. The assignment is carried out, in particular, by correspondingly drilling the hydraulic block, with the result that the at least two installation spaces communicate with one brake circuit. The hydraulic block permits two or more hydraulic reservoirs to be assigned to one brake circuit of the vehicle brake system if a hydraulic reservoir is indispensable in another brake circuit. It is also conceivable to provide an external hydraulic reservoir for the other brake circuit. The advantage of the hydraulic block disclosed herein is that an existing hydraulic block can be used and only slight changes have to be made to the drilled arrangement. The position of the hydraulic reservoirs in the hydraulic block does not change, and it is possible to double the volume of the hydraulic reservoirs of a brake circuit without changing the installation spaces for the hydraulic reservoirs in the hydraulic block, in particular without having to enlarge the latter. Mechanical and hydraulic connections of the hydraulic block remain unchanged, with the result that the accommodation of the hydraulic block in the motor vehicle does not have to be changed. The hydraulic block and/or the vehicle brake system can as a result be adapted with little expenditure to wheel brakes with large brake fluid volumes, as such as are used, for example, in armored vehicles or in lightweight trucks or for multi-piston brake calipers.

The at least two installation spaces for hydraulic reservoirs can be connected to various points of the one brake circuit. The at least two installation spaces preferably communicate with one another, i.e. their hydraulic reservoirs are connected hydraulically in parallel. They are connected, for example, between the brake pressure reduction valves of the wheel brakes and a suction side of the hydraulic pump of a brake circuit. As a result, the volumes of the at least two hydraulic reservoirs are available for lowering the wheel brake pressures of the wheel brakes of the one brake circuit.

In some embodiments, an existing connection of an installation space for a hydraulic reservoir to a brake circuit in the hydraulic block is closed. This can be done by pressing in a ball, turning in a screw or with some other suitable closure body or else in some other way. The one installation space for a hydraulic reservoir is connected to another brake circuit by drilling the hydraulic block or else in some other way. This refinement permits the use of an existing hydraulic block with all the drilled holes provided, wherein one or more drilled holes are additionally formed, but no drilled hole has to be omitted.

BRIEF DESCRIPTION OF THE DRAWING

The disclosure will be explained in more detail below with reference to an exemplary embodiment illustrated in the drawing. The drawing shows a hydraulic block according to the disclosure in a schematic, perspective and partially simplified illustration.

DETAILED DESCRIPTION

The hydraulic block 1 which is illustrated in the drawing is provided for accommodating and hydraulically switching hydraulic components (not illustrated) of a brake pressure control operation of a hydraulic vehicle brake system. Such brake pressure control operations are known per se and are used, for example, for anti-lock brake control, traction control and/or vehicle movement dynamics control. Such hydraulic blocks are also used for performing braking force control of electro-hydraulic vehicle brake systems. A further field of use is braking force control in the case of what is referred to as "blending" in vehicle brake systems of hybrid vehicles or electric vehicles. In such vehicles, an electric drive motor is operated as a generator during deceleration in order to convert kinetic energy of the vehicle into electrical energy which is stored in an accumulator and as a result made available for driving the vehicle. "Blending" signifies a reduction in the braking force of the vehicle brake system in order to at least partially balance a braking torque which the electric drive motor generates in the generator mode.

The hydraulic block 1 is a right-parallelepiped-shaped component made of metal which is provided with a plurality of drilled holes of various sizes. For a two-circuit vehicle brake system the hydraulic block is normally symmetrical. The drilled holes form receptacles into which the hydraulic components (not illustrated) are inserted or installed, or connecting lines which connect the hydraulic components to one another. The hydraulic components are, for example, a hydraulic pump, usually a piston pump, for each brake circuit, solenoid valves, nonreturn valves, pressure-limiting valves, hydraulic reservoirs.

The illustrated hydraulic block 1 is provided for a two-circuit vehicle brake system. It has, centrally in a flat side, a cylindrical drilled hole 2 with a comparatively large diameter which serves to accommodate an eccentric (not illustrated) which itself serves to drive piston pumps 10, 11. This drilled hole 2 is referred to below as an eccentric space 2. An electric motor (not illustrated) which is attached to the flat side of the hydraulic block 1, for example screwed on, serves to drive the eccentric.

Two stepped-diameter pump drilled holes 3 proceed from the eccentric space 2, radially on the same axis on opposite sides from one another, and are provided for the use of piston pumps 10, 11. Each piston pump 10, 11 is assigned to a brake circuit 12, 13, respectively. Drilled connecting lines 4 proceed radially from the pump drilled holes 3 and open into installation spaces 5 for the installation of hydraulic reservoirs 14, 15. The installation spaces 5 are likewise embodied as stepped drilled holes. In conventional vehicle brake systems, each brake circuit 12, 13 is assigned a hydraulic reservoir which is connected between a suction side of the hydraulic pump and brake pressure reduction valves of wheel brake. The installation spaces 5 of the hydraulic block 1 for the hydraulic reservoirs 14, 15 are accordingly connected hydraulically by the connecting lines 4. In the hydraulic block 1 according to the disclosure, the connecting line 4 of one of the two hydraulic reservoirs 15 is connected to one of the two piston pumps 11 by a pressed-in ball 6, the installation space 5 for the one hydraulic reservoir 15 is therefore separated from this brake circuit 13. The separation is also possible in another way with a ball. It is also, for example, conceivable that the connecting line 4, which connects the installation space 5 for the one hydraulic reservoir 15 to the pump drilled hole 3 of the one brake circuit 13, is not provided at all in the hydraulic block 1.

An additional drilled hole 7 connects the two installation spaces 5 for the hydraulic reservoirs 14, 15 to one another, with the result that the hydraulic reservoirs 14, 15 are connected hydraulically in parallel when they are installed in the installation spaces 5. As a result, both hydraulic reservoirs 14, 15 are connected to one, specifically the other, brake circuit 12. They communicate with one brake circuit 12 of the two brake circuits 12, 13, In this way, the volume of both hydraulic reservoirs 14, 15 is made available to one brake circuit 12 of the two brake circuits 12, 13.

The hydraulic block 1 can be used for hydraulic vehicle brake systems in which just one brake circuit requires a hydraulic reservoir, or else for single-circuit vehicle brake systems. It is also conceivable to provide for the other brake circuit an external hydraulic reservoir, that is to say, for example, a hydraulic reservoir which is attached to the outside of the hydraulic block 1 or connected elsewhere (not illustrated). The hydraulic block 1 makes twice the brake fluid volume available to one of the two brake circuits. In this context, only slight changes are necessary to the hydraulic block 1, specifically the additional drilled hole 7 and the closure of the one connecting line 4 or some other hydraulic separation of the one insulation space 5 for a hydraulic reservoir from the one brake circuit. Other changes to the hydraulic block are not necessary, and it can be installed at the customary location in a motor vehicle and with a mount which is provided.

The invention claimed is:

1. A hydraulic block for a hydraulic multi-circuit vehicle brake system, comprising:
 a first installation space defined in the hydraulic block and configured to accommodate a first hydraulic reservoir;
 a second installation space defined in the hydraulic block and configured to accommodate a second hydraulic reservoir;
 a first connection line defined in the hydraulic block opening into the first installation space;
 a second connection line defined in the hydraulic block opening into the second installation space; and
 a third connection line defined in the hydraulic block fluidly connecting the first and second connection lines, wherein:
  the first and second installation spaces are in fluid communication with one another and are configured to be in fluid communication with a first brake circuit of the multi-circuit vehicle brake system, the first connection line is configured to connect to the first brake circuit, the second connection line is configured to connect to a second brake circuit of the multi-vehicle brake system, and the second connection line is sealed between the second installation space and the second brake circuit in such a way that the first and second installation spaces are in fluid communication with the first brake circuit and are not in fluid communication with the second brake circuit.

2. The hydraulic block as claimed in claim 1, further comprising:

a first pump bore defined in the hydraulic block in fluid communication with the first connection line, the first pump bore being configured to receive a first pump; and a second pump bore defined in the hydraulic block in fluid communication with a portion of the second connection line that is sealed from the second installation space, the second pump bore being configured to receive a second pump.

3. A hydraulic multi-circuit vehicle brake system comprising:

a first hydraulic reservoir;

a second hydraulic reservoir;

a first brake circuit a hydraulic block defining (i) a first installation space in which the first hydraulic reservoir is positioned and (ii) a second installation space in which the second hydraulic reservoir is positioned; and a second brake circuit, wherein:

the first and second installation spaces are in fluid communication with one another and are in fluid communication with the first brake circuit, the hydraulic block defines a first connection line opening into the first installation space, a second connection line opening into the second installation space, and a third connection line fluidly connecting the first and second connection lines, the first connection line is connected to the first brake circuit, the second connection line is connected to the second brake circuit, and the second connection line is sealed between the second installation space and the second brake circuit in such a way that the first and second installation spaces are in fluid communication with the first brake circuit and are not in fluid communication with the second brake circuit.

4. The hydraulic block as claimed in claim 3, further comprising:

a first pump in fluid communication with the first brake circuit; and a second pump, wherein:

the hydraulic block defines a first pump bore in in fluid communication with the first connection line, the first pump being arranged in the first pump bore, and the hydraulic block defines a second pump bore in fluid communication with a portion of the second connection line that is sealed from the second installation space, the second pump being arranged in the second pump bore.

* * * * *

UNITED STATES PATENT AND TRADEMARK OFFICE
CERTIFICATE OF CORRECTION

PATENT NO. : 9,783,179 B2
APPLICATION NO. : 13/823779
DATED : October 17, 2017
INVENTOR(S) : Volkmar Schlotter It is certified that error appears in the above-identified patent and that said Letters Patent is hereby corrected as shown below:

In the Claims

In Column 5, Lines 23-27, Lines 1-5 of Claim 3 should read:
3. A hydraulic multi-circuit vehicle brake system comprising:
    a first hydraulic reservoir;
    a second hydraulic reservoir;
    a first brake circuit;

Signed and Sealed this
First Day of May, 2018

Andrei Iancu
*Director of the United States Patent and Trademark Office*